United States Patent [19]

Moore et al.

[11] Patent Number: 4,901,648

[45] Date of Patent: Feb. 20, 1990

[54] TROLLEY BRAKING METHOD AND APPARATUS FOR USE WITH CONVEYORS

[75] Inventors: Archie S. Moore; Stephen R. Bode, both of Kansas City, Mo.

[73] Assignee: Mid-West Conveyor Company, Inc., Kansas City, Kans.

[21] Appl. No.: 182,472

[22] Filed: Apr. 15, 1988

[51] Int. Cl.4 ............................................. B61H 13/00
[52] U.S. Cl. ........................................ 104/250; 188/62
[58] Field of Search ............... 104/249, 250, 251, 252, 104/172.4, 178, 179, 89; 188/62

[56] References Cited

U.S. PATENT DOCUMENTS

| | | |
|---|---|---|
| 1,802,109 | 4/1931 | Evans et al. |
| 3,285,195 | 11/1966 | Babson. |
| 3,301,413 | 1/1967 | Coursey. |
| 3,705,554 | 12/1972 | Aksamit ............................. 104/250 |
| 3,929,079 | 12/1975 | Eliassen. |
| 3,948,187 | 4/1976 | Moore ................................ 104/250 |
| 4,603,639 | 8/1986 | Sleep .................................. 104/250 |
| 4,790,247 | 12/1988 | Summa ............................... 104/250 |

Primary Examiner—Sherman D. Basinger
Assistant Examiner—Stephen P. Avila
Attorney, Agent, or Firm—Litman, McMahon & Brown

[57] ABSTRACT

A weight bearing trolley moves along a track having flanges between which a guide wheel of said trolley is positioned. The movement of the trolley is monitored to determine when braking is desired and, when desired, pressure is applied to said guide wheel, forcing it into contact with one of said flanges and producing frictional retarding force braking said trolley. A fail-safe actuator utilizes fluid pressure to keep a brake operating spring compressed when braking is not wanted.

14 Claims, 2 Drawing Sheets

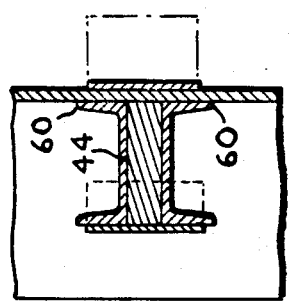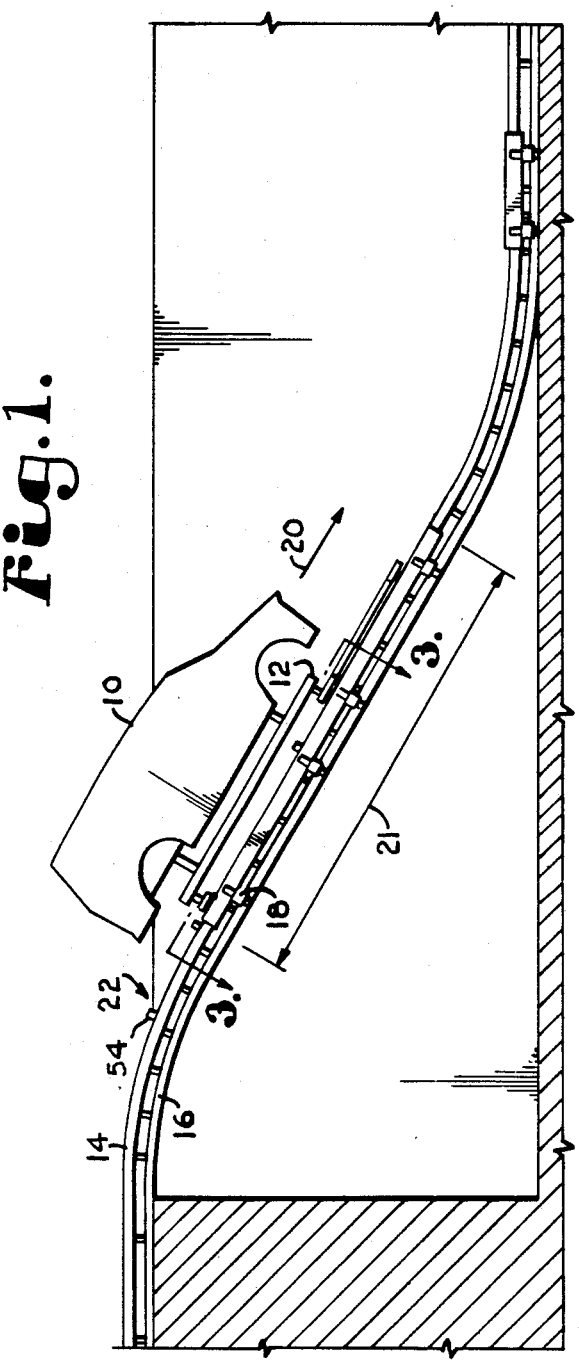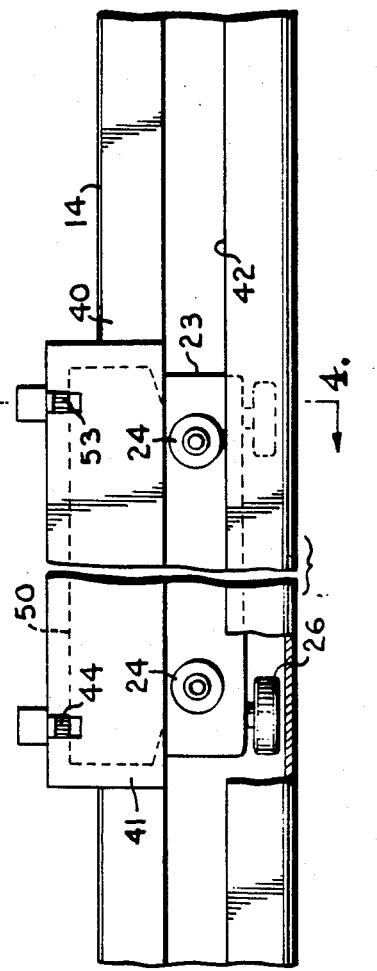

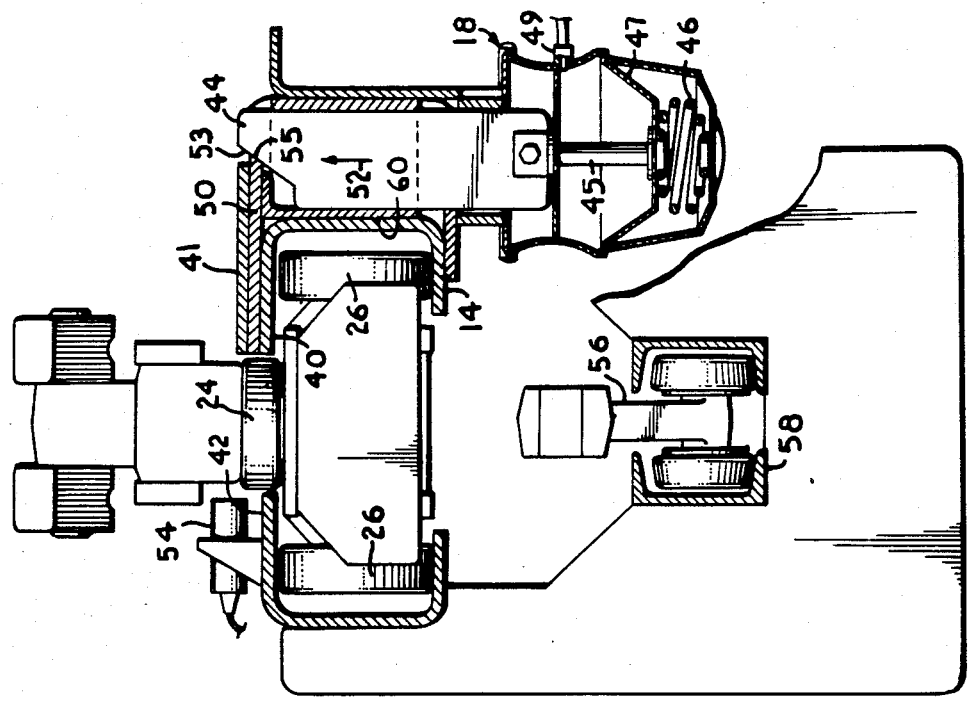
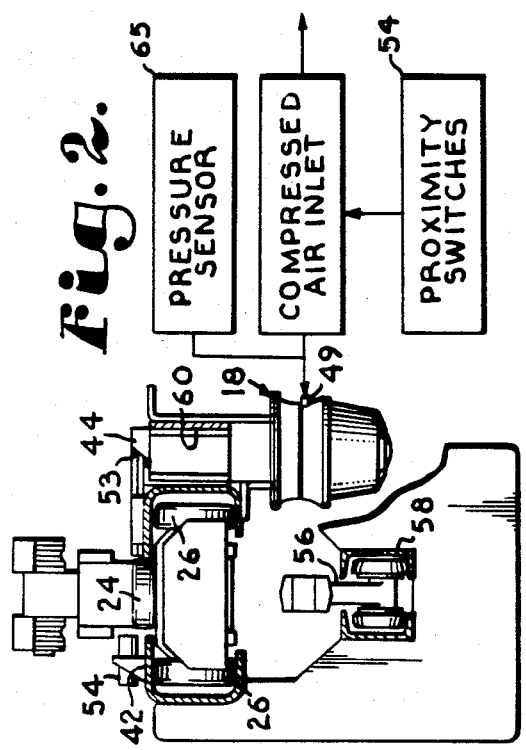
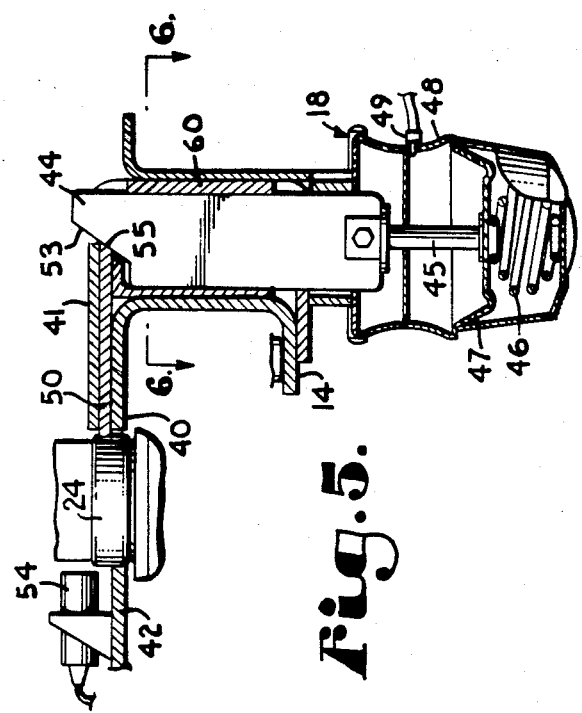

TROLLEY BRAKING METHOD AND APPARATUS FOR USE WITH CONVEYORS

BACKGROUND OF THE INVENTION

There is a continual need to move items from one location inside of a factory or warehouse to another. This often involves moving the items up or down steep inclines, as well as horizontally. Various systems have been developed by which material can be moved automatically along a selected conveyance path through a factory or warehouse. One such system is described in U.S. Pat. No. 4,438,701 to Murai et al.

In the Murai patent, a system is set forth wherein a series of trolleys are guided along a trolley track by a power conveyor (usually a chain type). The power conveyor runs parallel to and, in this case, directly below the trolley track, however, it is commonly positioned above the trolley track also. The trolleys support a carrier upon which a large variety of loads can be placed for transport to any destination along the track. The system set forth in Murai is equipped with a device which will disengage the drive mechanism from the trolleys in the event that the support carrier collides with another carrier in front of it. While this safety feature is clearly very beneficial, it still leaves potential for a serious accident to occur.

For example, a problem that has been experienced with the Murai system is that the trolleys and the power conveyor have been known to become inadvertently disengaged allowing the trolleys to cruise along the track unbridled. Another problem is that a power conveyor malfunction allows the trolleys to travel at uncontrollable speeds along the track. If either of these situations occurs while the trolleys and load carrier are on level track, the situation is generally not that serious, but clearly undesirable. However, as these carriers often transport items as large as automobiles, a power conveyor malfunction or trolley disengagement on a sloped track produces the potential for disaster.

Accordingly, systems have been developed to retard "run away" trolleys propelled along horizontal paths or down vertical slopes. However, these prior art systems are all characterized by various disadvantages.

One such prior art solution has been to install a third conveyor (separate from the power and free conveyor) which is driven by the carrier as it travels down a vertical decline. This third conveyor is equipped with a speed sensing device which, when an over speed situation is detected, activates a brake. The brake then applies a torque force to the head shaft of the third conveyor which, because it is connected to the carrier, brings the carrier to a stop. A disadvantage to this prior art solution is that it is very expensive because it requires an entirely separate conveyor in addition to the already existing track network. Also, since an additional conveyor is a separate system from the main track network, it requires a substantial amount of additional space. In manufacturing, space is at an absolute premium and any system requiring large amounts of space is considered to have serious drawbacks.

Another solution also involves a separate conveyor which is connected to the carrier. In this solution the separate conveyor is electrically driven at a speed slightly greater than that at which the power conveyor is driven. During normal operation the power conveyor acts as a hold back to the force of the separate conveyor. In the event that the trolleys become disengaged from the power conveyor, the carrier will speed up to the pace of the separate conveyor but will go no faster.

Clearly, as this solution requires the installation and operation of an additional conveyor system, the same disadvantages that are experienced with the first noted prior art solution are experienced with this solution as well.

A third prior art solution involves an inertially triggered device that, in the event an over speed situation occurs, throws a stop in front of the carrier. While this system is less expensive than other prior art solutions, it stops the carrier in an extremely abrupt fashion which is not desirable. Moreover, by virtue of the principles upon which this system operates, it is very difficult to cushion the carrier deceleration.

In short, systems for the transportation of heavy, bulky items within a manufacturing plant should be compact, inexpensive and easily installed and include a mechanism by which loaded carriers traveling freely down sloped tracks can be gradually brought to a stop.

SUMMARY OF THE INVENTION

In accordance with the present invention the problems of the prior art are greatly resolved by the system of the present invention which is a braking arrangement for use with declines as well as horizontal pathways. In the example described, the speed of a load bearing carrier, in an inverted power and free conveyor system, is monitored by sensors spaced along a vertical decline in a free track. The carrier sits upon a series of trolleys which ride in the free track and are driven by a power conveyor which travels in a track which runs parallel to and below the free track.

The logic in an electronic processor monitors the time interval for a given trolley to travel from one sensor to another sensor in sequence. If that time interval is shorter than a preset time interval, then the system senses an overspeed condition and activates a brake which acts on a guide wheel of the trolley.

During normal operation of the conveyor system, the brake is held released by a compressed air chamber with a diaphragm which compresses a spring actuator. However, when the above noted sensors sense a predetermined condition, such as overspeed, a valve is triggered which releases pressure from the compressed air chamber, thereby removing the compression force acting on the spring through the diaphragm. The spring then extends and forces a braking arrangement into a guide path in the free track. As a result, in accordance with the present invention, friction is applied to the guide wheel of the trolley which during normal operation is allowed to travel freely in a guide path of the free track. The trolley and riding carrier are gradually brought to a stop as a result of this friction.

The present invention overcomes the problems of the prior art by applying a force to the trolleys through their guide wheels. This brings the load bearing carrier to a slow speed or gradual stop as opposed to the abrupt stop effected by the prior art inertially triggered device. Also, since the present invention is compact and attaches directly to the existing inverted power and free conveyor system, it is inexpensive as compared to the prior art solutions because it does not involve an additional conveyor system, and is more easily installed.

It is therefore an object of the present invention to offer a means by which loads traveling along free conveyor tracks can be braked to a slower speed or brought to a gradual stop in a relatively short distance.

It is a further object of the present invention to offer safer use of power and free conveyors adapted for carrying heavy loads.

It is yet another object of the present invention to offer a more cost effective system to the problem of braking or stopping "run away" carriers than prior art systems by offering a system that is more compact, less expensive, and more easily installed than prior art arrangement.

BRIEF DESCRIPTION OF THE DRAWINGS

FIG. 1 is an assembly drawing of an inverted power and free conveyor system equipped with trolley braking arrangement in accordance with the present invention. A load bearing carrier is shown traveling along the trolley track.

FIG. 2 is an assembly drawing in accordance with the present invention of the braking mechanism, free trolley, power conveyor and associated track. A schematic representation is shown of proximity switches to the compressed air inlet to the braking mechanism communication network.

FIG. 3 is a section view of the system shown in FIG. 1 taken along line 3—3 with the trolley's guide wheels and one support wheel visibly positioned in the free track.

FIG. 4 is a section view of FIG. 2 taken along line 4—4 of a typical braking zone cross-section in accordance with the present invention during normal conveyor operation.

FIG. 5 is a typical braking zone cross-section in accordance with the present invention during braking operation; and FIG. 6 is a section view of FIG. 4 taken along line 6—6 of the bottom of a typical stop cam in accordance with the present invention and the channel within which it travels.

DESCRIPTION OF THE PREFERRED EMBODIMENTS

At the outset the invention is described in its broadest overall aspects with a more detailed description following. As illustrated in FIG. 1, in accordance with this example of the present invention a load 10 rides down a vertical decline in the direction of arrow 20 on a carrier 12 which is guided along a free track 14 by a series of trolleys (not shown). The trolleys are driven by a power conveyor (not shown) which rides in a power track 16. Proximity switch locations 22 are deliberately selected such that the proximity switches can monitor the speed of the carrier 12 and activate the brake 18 in the event, for example, that an overspeed condition develops. FIG. 2 schematically represents how the proximity switches 54 communicate with the brake 18 through a compressed air inlet 49.

In accordance with this example of the present invention, FIG. 3 shows a bottom view of a trolley 23 riding in the free track 14. In this view the trolley guide wheels 24, which are designed to keep the trolley on a proper path, and one of the trolley load support wheels 26 are clearly visible.

FIG. 4 shows a cross-section of the braking mechanism of the present invention during normal operation of the conveyor. The proximity switch 54 monitors normal progression of the trolley 23. The trolley travels on the support of its wheels 26 resting on the free track 14. The trolley 23 is guided by a guide wheel 24 positioned between two inwardly directed upper flanges 40 and 42 of the free track 14 and is driven by a power conveyor 56 traveling along a power track 58. The drive connection between the power conveyor and the trolley is not shown. When the time interval of the trolley 23 traveling from one proximity switch 54 to the next (not shown) becomes shorter than a preset interval, an overspeed condition exists and the braking sequence will be set into action. Also, in the event that the proximity switch 54 monitors a different number of trolleys from that recorded by the adjacent proximity switches (not shown) an alarm signal is sounded and the braking sequence is activated. This may result from a faulty proximity switch.

In accordance with this example of the present invention, when the proximity switch 54 initiates the braking sequence, a valve (not shown) is electrically triggered to open a port 49 in a compressed air chamber 48 which releases compressed air from the chamber 48. This action relaxes a diaphragm 47 which removes a compression force from a spring 46. As a result, the spring 46 extends and forces a brake rod 45 in the direction of arrow 52. Subsequently, the brake rod 45 acts on a stop cam 44 which, as can be seen in FIG. 6, travels between two brackets 60. When acted upon by the force of the brake rod 45, the stop cam 44 also moves in the direction of arrow 52.

This motion causes a working cam surface 53 of the stop cam 44 to act on a mating cam surface 55 of a stop blade 50. The stop blade 50 is, in this example, slidably sandwiched between one flange 40 of the free track 14 and a plate 41 suitably mounted with respect to the free track 14. The sliding displacement of the stop blade 50 brings it against the trolley guide wheel 24 with clamping force, FIG. 5.

With reference to FIGS. 1 and 3, the stop blade 50 may run the entire length of the brake zone 21 and as many spaced stop cams 44, with associated driving structure, as desired may be used. Thus, in accordance with the present invention and as is shown in FIG. 5, the resultant of the force from the spring 46 clamps the trolley guide wheel 24 between the stop blade 50 on the right and the free track flange 42 on the left, producing braking friction.

By this example of the present invention, both the free track 14 and the stop blade 50 are longitudinally stationary so that when the lateral clamping force of the stop blade 50 is applied to the trolley guide wheel 24, the wheel cannot freely roll, but rather, slides relative to either or both the free track flange 42 and the stop blade 50. The resulting friction applies a substantial but gradual decelerating force to the load bearing carrier through the trolley guide wheel 24 and the trolley 23.

Since it is imperative, when the power and free conveyor system is normally functioning, that the braking system of the present invention not be engaged, the present invention offers a fail-safe feature. In the event that the flow of compressed air to the compressed air chamber 48 is interrupted due to a faulty compressor, broken air line or the like, a pressure sensor 65 is provided so that if the pressure drops below that which is required to keep the spring 46 compressed, an electric signal immediately stops the power conveyor 56 and sounds an alarm thereby avoiding damage to the system and alerting an attendant of a problem.

The invention may be embodied in other specific forms without departing from the spirit or essential characteristics thereof. For example, the stop blade 50 and/or flange 42 may incorporate brake pads (not shown) of an appropriate material to improve braking characteristics and/or lessen potential damage to the guide wheel 24. The present embodiments are, therefore, to be considered in all respects as illustrative and not restrictive, the scope of the invention being indicated by the claims rather than by the foregoing description and all changes which come within the meaning and range of equivalency of the claims are therefore intended to be embraced within.

What is claimed and desired to be secured by Letters Patent is as follows:

1. A method of braking a trolley associated with a load moving down an inclined track and in danger of a runaway, said track having flanges between which a guide wheel of said trolley is positioned, comprising:
   (a) monitoring a speed of said trolley; producing a speed signal associated with the speed of said trolley;
   (b) comparing said speed signal to a predetermined signal which is indicative of excessive trolley speed; and
   (c) applying pressure to said guide wheel when said speed signal equals or exceeds said predetermined signal, said pressure being applied in a direction which forces said guide wheel into speed retarding frictional contact with one of said flanges, thereby slowing said trolley.

2. A method as set forth in claim 1 wherein said pressure is applied to said guide wheel transversely to the axis of said guide wheel.

3. A method of braking a weight bearing trolley moving along a track having flanges between which a guide wheel of said trolley is positioned, said track including a brake blade, said method comprising:
   (a) clamping said guide wheel of said trolley between one of said flange and said blade thereby creating a frictional retarding force opposing the kinetic energy of the trolley motion.

4. A method as set forth in claim 3 wherein said stop blade is substantially longitudinally stationary in the direction of trolley travel.

5. Apparatus for braking a trolley associated with a load moving down an inclined track and in danger of a runaway, said track having a first and a second inwardly directed flange, comprising:
   (a) a guide wheel attached to the trolley, said guide wheel being positioned to travel between said flanges;
   (b) a brake mechanism associated with the track in a predetermined braking zone, said brake mechanism being adapted to engage said guide wheel and clamp said guide wheel against said first flange of the track in said braking zone;
   (c) means to sense the speed of the trolley, to produce a signal related to the speed of the trolley and to compare the speed signal to a predetermined signal, said predetermined signal being indicative of excessive trolley speed; and
   (d) means for activating said brake mechanism when the trolley speed signal is equal to or exceeds said predetermined signal; said activating means causing clamping of said guide wheel between the brake mechanism and said first flange of the track, thereby braking the trolley.

6. Apparatus as set forth in claim 5 wherein the brake mechanism includes a blade which is urged against the trolley guide wheel in a direction which clamps the guide wheel between the blade and said first flange of the track, creating a frictional retarding force.

7. Apparatus as set forth in claim 6 wherein the brake mechanism includes a stop cam engageable with said stop blade, said stop blade being urged against the trolley guide wheel by the movement of said stop cam.

8. A system as set forth in claim 7 including a brake rod and a spring bearing against said brake rod, said brake rod in turn bearing against said stop cam and urging same against said stop blade as a result of pressure indirectly applied by said spring.

9. Apparatus braking a trolley which is traveling along a track having inwardly directed flanges, comprising:
   (a) a guide wheel attached to the trolley, said guide wheel being positioned to travel between said flanges;
   (b) a brake mechanism associated with the track in a predetermined braking zone, said brake mechanism being adapted to engage said guide wheel and clamp said guide wheel against one of the flanges of the track in the braking zone, said braking mechanism including a sliding stop blade which is urged against the trolley guide wheel thereby clamping the guide wheel between the stop blade and said first flange of the track, said brake mechanism further including a compressed air chamber pressurized by a normally constant compressed air feed, said compressed air chamber having a diaphragm which, when said chamber is pressurized, acts in opposition to a spring associated with said chamber, said spring, when said chamber is not pressurized, being uncompressed by said diaphragm and allowed to act upon said stop blade; and
   (c) means for activating the brake mechanism causing clamping of the guide wheel between said brake mechanism and said first flange of the track, thereby braking the trolley.

10. Apparatus as set forth in claim 9 including an electronic monitoring device which monitors the speed of the trolley by comparing the intervals at which trolleys pass from one electronic sensor to the next to a preset interval, and in the event that an overspeed condition exists, electronically signals a compressed air valve associated with said compressed air chamber, to release pressure from said chamber.

11. Apparatus as set forth in claim 10 including an alarm system associated with said monitoring device, said alarm system being adapted to produce a signal in the event that one electronic sensor counts a different number of passing trolleys than an adjacent sensor, indicating a faulty sensor.

12. Apparatus as set forth in claim 9 including a pressure switch on said air feed, said pressure switch being sensitive to a pressure insufficient to allow the compressed air chamber diaphragm to keep said stop blade released, and means adapted to disconnect drive power to the trolley when such sufficient pressure is sensed.

13. Apparatus as set forth in claim 9 including a quick exhaust valve associated with said compressed air chamber and adapted to allow rapid depressurization of the chamber thereby shortening the response time between detection of a braking signal and application of said stop blade.

14. A method of braking a trolley associated with a load moving down an inclined track and in danger of runaway, said track having flanges between which a portion of said trolley is positioned, comprising:
 (a) monitoring the speed of said trolley and producing a signal related to said trolley speed;
 (b) comparing said speed signal to a predetermined signal which is indicative of excessive speed; and
 (c) applying pressure to said portion when said speed signal of the trolley equals or exceeds the predetermined signal thereby forcing said portion into retarding frictional contact with one of said flanges and thereby slowing the trolley.

* * * * *